Figure 1:
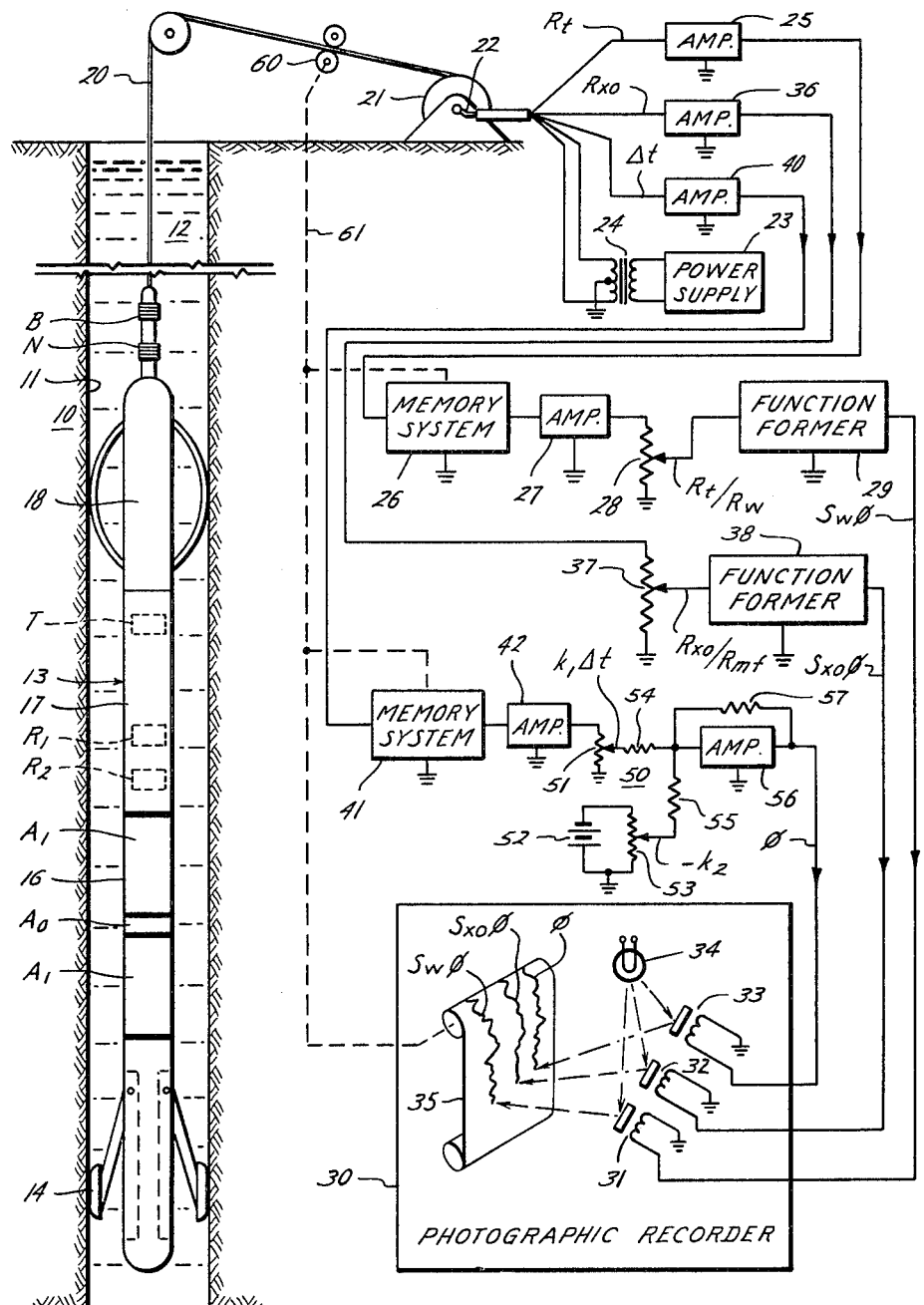

Jan. 19, 1965     M. L. MILLICAN     3,166,708
METHOD OF INVESTIGATING EARTH FORMATIONS BY DETERMINING
THE AMOUNTS OF DIFFERENT TYPES OF FLUIDS THAT MAY
BE PRESENT IN THE FORMATIONS

Filed May 7, 1962     2 Sheets-Sheet 1

Marcus L. Millican
INVENTOR.

BY Richard E. Bee
ATTORNEY

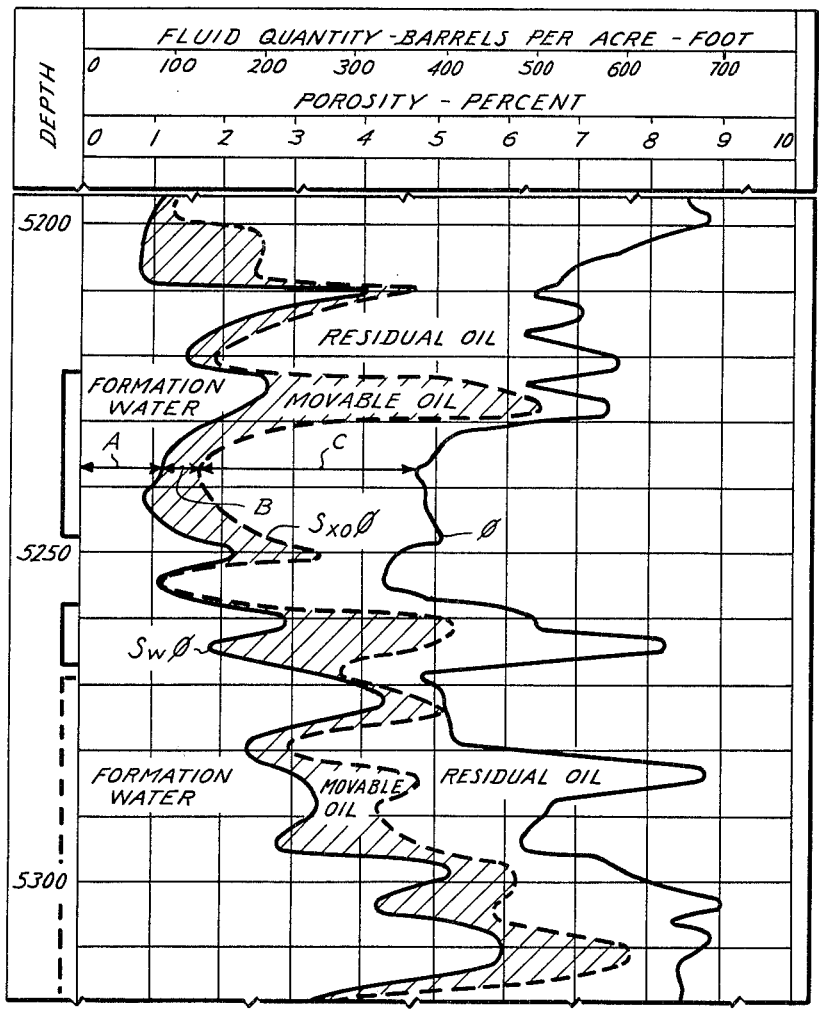

United States Patent Office 3,166,708
Patented Jan. 19, 1965

---

3,166,708
METHOD OF INVESTIGATING EARTH FORMATIONS BY DETERMINING THE AMOUNTS OF DIFFERENT TYPES OF FLUIDS THAT MAY BE PRESENT IN THE FORMATIONS
Marcus L. Millican, Midland, Tex., assignor to Schlumberger Well Surveying Corporation, Houston, Tex., a corporation of Texas
Filed May 7, 1962, Ser. No. 192,662
6 Claims. (Cl. 324—1)

This invention relates to methods of investigating earth formations and particularly to methods for investigating subsurface earth formations which have been penetrated by a borehole drilled into the earth.

In seeking to determine the presence and depth of hydrocarbon-bearing zones (oil, gas, etc.) that may exist in the subsurface earth formations penetrated by a borehole drilled into the earth, various types of exploring devices may be lowered into the borehole for measuring various properties of the formations adjacent the borehole. The three principal types of such exploring devices are electrical exploring devices (either electrodes or induction coils), sonic exploring devices and radioactivity exploring devices (gamma ray, neutron, gamma-gamma density, etc.).

The electrical exploring devices measure the electrical resistivities (or conductivities) of the earth formations. These electrical resistivities are determined primarily by the amount, distribution and resistivity of the fluid or fluids contained in the formation pore spaces. The sonic exploring devices, on the other hand, measure the time required for sound waves to travel across a given span of the earth formation. This sonic travel time is determined primarily by the nature of the rock structure and particularly its porosity. The radioactivity exploring devices measure either the natural radioactivity of the formations or the radioactivity induced therein by bombardment of the formations with radioactive particles or rays. In the latter case, the amount of induced radioactivity is dependent on the concentration of the formation fluids and, hence, on the porosity of the rock structure which determines the fluid concentration.

In general, none of these measurements give a direct and positive indication that hydrocarbons are present in the subsurface formations. The various factors which affect each measurement have to be taken into account and an interpretation or deduction made as to the probable existence of hydrocarbons. Sometimes this is rather simple and straight forward and sometimes it is not, depending on the conditions encountered in the particular formation being observed. In any event, a major difficulty is that the measurements are usually made in a continuous manner over several hundred feet, often several thousand feet, of borehole depth. This makes a careful point by point interpretation of the recorded measurements rather time consuming. It also increases the possibility of overlooking a commercially interesting zone.

A simple qualitative knowledge that some hydrocarbons are present in a given formation is frequently an insufficient answer. In most oil-bearing formations, for example, formation water is usually present along with the oil. If more water than oil is present, then commercial production probably would not be very profitable. Consequently, it is frequently necessary to determine in a quantitative manner the relative amounts of water and oil which are present in a given formation zone. This renders the interpretation process more difficult and time consuming.

Another problem that remains, even though the amount of oil has been determined, is to determine how much of this oil may be readily extracted from the formation. Some of the oil is usually so tightly held in some of the formation pore spaces that, as a practical matter, it can be considered as being unproducible. It would be desirable, therefore, to have some means for determining the relative amounts of producible oil and residual or unproducible oil.

It is an object of the invention, therefore, to provide new and improved methods for investigating subsurface earth formations traversed by a borehole.

It is another object of the invention to provide a new and improved method for determining the amount of readily producible hydrocarbons in subsurface earth formations.

It is a further object of the invention to provide a new and improved method for determining in a quantitative manner the amounts of the different types of fluids that may be present in a subsurface earth formation.

For a better understanding of the present invention, together with other and further objects thereof, reference is had to the following description taken in connection with the accompanying drawings, the scope of the invention being pointed out in the appended claims.

Referring to the drawings:

FIG. 1 shows a representative embodiment of apparatus that may be used to practice the present invention; and FIG. 2 shows a portion of a graphic record obtained with the FIG. 1 apparatus.

Referring to FIG. 1 of the drawings, there is shown a representative embodiment of apparatus for investigating subsurface earth formations 10 traversed by a borehole 11 which is drilled into the earth. Borehole 11 is filled with a conductive fluid 12 commonly referred to as "drilling mud." The investigating apparatus includes a tool or instrument 13 which is adapted to be lowered into the borehole 11. The instrument 13 includes three different exploring devices. A first of these exploring devices is an electrical-type exploring device 14 for measuring the electrical resistivity of a relatively small volume of formation material lying immediately adjacent the wall of borehole 11. In the present embodiment, this exploring device 14 is a focussed type of electrode system mounted on the wall-engaging face of a pad member. During the operation of the device 14, the pad member is urged against the borehole wall by a suitable mechanism contained within the lower portion of the instrument 13. Suitable electrode systems for this purpose are described in greater detail in Patent No. 2,712,629, granted to H. G. Doll on July 5, 1955, and in Patent No. 2,803,796, granted to N. A. Schuster on August 20, 1957.

The borehole instrument 13 includes a second exploring device 16. This exploring device is also of the electrical type and is designed to measure primarily the electrical resistivity of a portion of the formation material lying at a relatively large lateral distance from the wall of borehole 11. In other words, the exploring device 16 is constructed to provide relatively deep lateral investigation of the adjacent earth formations. In the present embodiment, this exploring device 16 includes a central survey current electrode $A_0$ and upper and lower focussing current electrodes $A_1$. Deep investigation electrode devices of this type are described in greater detail in Patent No. 2,712,628, granted to H. G. Doll on July 5, 1955, and in copending application Serial No. 759,743, filed in the name of M. F. Easterling on September 8, 1958, now Patent No. 3,031,612.

The borehole instrument 13 further includes a third exploring device 17 for determining the porosity of the formation material adjacent the borehole 11. In the present embodiment, the exploring device 17 is of the sonic type and as such includes within the housing of instrument 13 a sound wave transmitter T and a pair of sound wave receivers $R_1$ and $R_2$. Sonic exploring devices of this type are described in greater detail in Patent No. 2,938,592, granted to C. J. Charske et al. on May 31, 1960, and in copending application Serial No. 745,548, filed in the name of F. P. Kokesh on June 30, 1958.

The various electrical circuits described in the above-mentioned patents and applications for operating the three exploring devices 14, 16 and 17 are contained within an upper fluid-tight section 18 of the borehole instrument 13. In order to prevent the electrical devices 14 and 16 from interferring with one another, they may be operated at different frequencies or, instead, a suitable time-sharing technique may be utilized.

The borehole instrument 13 is suspended in the borehole 11 by means of an armored multiconductor cable 20. Cable 20 is, in turn, wound on a suitable drum and winch mechanism 21. The drum and winch mechanism 21 and the remainder of the apparatus shown in FIG. 1 is located at the surface of the earth, the remainder of the apparatus comprising for the most part suitable electrical circuits for processing and recording the signals developed by the borehole exploring devices 14, 16 and 17. These surface circuits are connected to the individual insulated conductors contained within the cable 20 by means of a suitable commutator mechanism indicated generally at 22. Suitable power for operating the electrical circuits and devices contained within the borehole instrument 13 is provided by a surface power supply 23 which is connected to the borehole instrument 13 by way of a transformer 24, the commutator mechanism 22 and an appropriate pair of conductors in the cable 20. A center tap on the secondary of transformer 24 is grounded to provide a phantom-type ground return circuit for the signals sent up from the borehole instrument 13.

Considering first the surface circuits for processing the output signal from the deep investigation resistivity device 16, this output signal (designated as $R_t$) is supplied by way of an amplifier 25 to a memory system 26. Memory system 26 serves to temporarily store the $R_t$ resistivity signal until the borehole instrument 13 has moved a predetermined distance in the borehole 11, at which time the $R_t$ signal appears at the output of the memory system 26. This depth delayed $R_t$ signal is then supplied by way of an amplifier 27 and a voltage divider 28 to a function former 29. Function former 29 is constructed to have an input-output signal transfer characteristic which is described by the mathematical expression:

$$V_{out} = \frac{1}{\sqrt{V_{in}}} \qquad (1)$$

where $V_{in}$ is the signal supplied to the input of function former 29 and $V_{out}$ is the signal appearing at the output of function former 29. The modified signal appearing at the output of function former 29 is supplied to a photographic recorder 30 for purposes of recording the value thereof.

Photographic recorder 30 includes three mirror-type galvanometer units 31, 32 and 33. These galvanometer units serve to deflect individual light beams from a light source 34 across the photosensitive surface of a chart-type recording film 35. The modified $R_t$ signal from function former 29 is supplied to the galvanometer unit 31 of the recorder 30.

The output signal from the shallow investigation resistivity device 14 (designated as $R_{xo}$) is supplied by way of an amplifier 36 and a voltage divider 37 to a function former 38. The input-output signal transfer characteristic of function former 38 is also described by Equation 1 above. The modified signal appearing at the output of function former 38 is supplied to a second galvanometer unit 32 in the recorder 30.

The output signal from the porosity-determining sonic device 17 (designated as $\Delta t$) is supplied by way of an amplifier 40 to a memory system 41. Memory system 41 serves to store the sonic $\Delta t$ signal until the borehole instrument 13 has moved a predetermined distance in the borehole 11, at which time the $\Delta t$ signal is reproduced at the output of memory system 41. This depth delayed $\Delta t$ signal is then supplied by way of an amplifier 42 to a computer system 50. The $\Delta t$ signal is actually a sonic travel time signal and corresponds to the time difference required for a sound wave from transmitter T to reach receivers $R_1$ and $R_2$. Computer 50 serves to convert this $\Delta t$ travel time signal to a signal corresponding to the porosity $\phi$ of the formation material.

As indicated by Wyllie's time-average formula, the relationship between the travel time $\Delta t$ and the porosity $\phi$ is:

$$\phi = k_1 \Delta t - k_2 \qquad (2)$$

where $$k_1 = \frac{V_m V_f}{V_m - V_f} \qquad (2a)$$

and $$k_2 = \frac{V_f}{V_m - V_f} \qquad (2b)$$

$V_m$ is the sonic velocity in the material forming the rock matrix itself, while $V_f$ is the sonic velocity in the fluid contained in the pore spaces.

Computer 50 serves to solve Equation 2. To this end, it includes a first voltage divider 51 for modifying the $\Delta t$ signal in accordance with the constant multiplier $k_1$. A battery 52 and a second voltage divider 53 serve to generate a negative signal corresponding to the constant factor $k_2$. The $k_1 \Delta t$ signal is supplied to a first input resistor 54 of an operational amplifier type of adding circuit. The negative $k_2$ signal is supplied to a second input resistor 55 of this same adding circuit. The adding circuit is completed by a high-gain amplifier 56 shunted by a feed-back resistor 57. The signal appearing at the output of amplifier 56 corresponds to the algebraic sum of the two signals supplied to the two input resistors 54 and 55. As indicated by Equation 2, this output signal thus corresponds to the desired porosity signal $\phi$. This porosity signal $\phi$ is supplied to the third galvanometer unit 33 of the recorder 30.

The two memory systems 26 and 41 and the recording film 35 are operated in synchronism with the movement of the borehole instrument 13 through the borehole 11. This synchronous operation is provided by means of a mechanical measuring wheel 60 which is rotated by movement of the cable 20 across the edge thereof. This measuring wheel 60 is connected by a suitable linkage system indicated schematically by dash line 61 to each of the memory systems 26 and 41 and the roller mechanism associated with recording film 35. Consequently, the storage elements in memory systems 26 and 41 and the recording film 35 are all advanced in synchronism with the movement of instrument 13 through the borehole.

For the present embodiment, it is assumed that the instrument 13 is being moved in an upwardly direction through the borehole 11. Consequently, it is for this reason that the memory systems 26 and 41 are associated with the two uppermost exploring devices 16 and 17. In other words, the signals obtained for a particular depth level in the borehole 11 by devices 16 and 17 are stored until the lowermost device 14 reaches this same depth level. If the vertical spacing between the centers of measurement for the three exploring devices is not too great, then memory systems 26 and 41 may be omitted and the necessary depth correction provided by suitable vertical adjustment of the light beams from galvanometers 31, 32 and 33.

Memory systems 26 and 41 may be of either the magnetic recorder type or the capacitor memory type, the former being described in greater detail in copending application Serial No. 807,221, filed in the name of H. G. Doll on April 17, 1959, and the latter being described in greater detail in copending application Serial No. 807,213, filed in the name of W. J. Sloughter on April 17, 1959.

Considering now the operation of the apparatus shown in FIG. 1, the borehole instrument 13 is initially lowered to the lowermost point of interest in the borehole 11. The instrument 13 is then raised in an upwardly direction toward the surface of the earth at a uniform rate. During this upward movement, the three exploring devices 14, 16 and 17 are operated to make their respective measurements on the adjacent earth formations. The pad-mounted electrode device 14 provides a shallow investigation resistivity signal $R_{xo}$. This $R_{xo}$ signal corresponds to the resistivity of the flushed zone immediately adjacent the borehole wall (the first few inches of the formation) for the case of a formation which has been invaded by fluid filtrate from the drilling mud 12. The deep investigation resistivity device 16 provides a resistivity signal $R_t$ which corresponds to the resistivity of an uncontaminated (uninvaded) portion of the formation lying at a relatively large lateral distance from the borehole wall. The sonic exploring device 17 provides a sonic travel time signal $\Delta t$ for the earth formation. This signal corresponds to the difference between the time required for a sonic wave to travel from the transmitter T to the receiver $R_1$ and the time required for the same wave to travel from the transmitter T to the receiver $R_2$.

The three output signals $R_{xo}$, $R_t$ and $\Delta t$ from the three exploring devices 14, 16 and 17 are sent up the cable 20 to the circuits located at the surface of the earth. The $R_t$ and $\Delta t$ signals for the exploring devices 16 and 17 are delayed by appropriate amounts by the memory systems 26 and 41 so that at any given instant the signals at the outputs of amplifiers 27 and 42 represent signals obtained at the same depth in the borehole 11 as is the signal which at that instant appears at the output of amplifier 36.

The sonic travel time signal $\Delta t$ is then converted to a porosity signal $\phi$ by the computer system 50. Computer 50 operates in accordance with the sonic time-average formula given above in Equation 2. Any adjustments necessary to account for any changes in the values of the matrix velocity $V_m$ and the fluid velocity $V_f$ are provided by suitable adjustment of the voltage dividers 51 and 53. $V_f$ is usually a constant factor and $V_m$, while it may vary somewhat from one geographical region to another, is usually fairly constant for any given borehole. The resulting porosity signal $\phi$ appearing at the output of amplifier 56 represents the fractional amount per unit volume of the formation volume which is occupied by pore space or, more accurately, the fractional amount which is not occupied by rock material. As indicated by Equation 2, the porosity $\phi$ is directly proportional to the sonic travel time $\Delta t$. The porosity signal $\phi$ is supplied to the galvanometer unit 33 to produce a correspondingly designated curve or trace on the recording film 35.

The deep investigation resistivity signal $R_t$ from the exploring device 16 is dependent on the formation porosity, the resistivity of any conductive fluid contained in the formation pore space and the percentage of the pore space which is occupied by this conductive fluid. For all practical purposes oil and other hydrocarbons are essentially non-conductive. Consequently, the connate formation water is the principal conductive fluid in the uncontaminated portion of the formation. The relationship between these quantities is described by the following mathematical expression:

$$S_w^n = \frac{aR_w}{\phi^m R_t} \quad (3)$$

where $\phi$ is the porosity or fractional amount of volume occupied by pore space, $S_w$ is the water saturation or fractional amount of pore space occupied by water in the uncontaminated zone, $R_w$ is the resistivity of the formation water, $a$ is a proportionality constant, $n$ is a saturation exponent and $m$ is a cementation exponent. For any given type of formation, the factors $a$, $m$ and $n$ are constants. For carbonate type formations (limestones, sandstones cemented with carbonate material, etc.), $a$ is equal to unity and $m$ and $n$ are equal to two. In this case, Equation 3 may be rewritten as:

$$S_w^2 = \frac{R_w}{\phi^2 R_t} \quad (4)$$

For sake of an example, these values of $a$, $m$ and $n$ shall be used hereinafter.

For purposes of the present method, Equation 4 should be rewritten in the form:

$$\sqrt{\frac{R_w}{R_t}} = S_w \phi \quad (5)$$

The quantity $S_w \phi$ has been found to be of considerable interest. It represents the fractional amount of formation volume which is occupied by formation water in the uncontaminated portion of the formation. Consequently, $S_w \phi$ gives an indication of the total amount of water which is present in the uncontaminated portion of the formation.

In order to determine $S_w \phi$, the $R_t$ signal obtained for the uncontaminated zone is applied to a voltage divider 28. Voltage divider 28 is set to modify this $R_t$ signal by a factor of $1/R_w$. Consequently, the signal applied to the input of function former 29 corresponds to the ratio $R_t/R_w$. Any necessary adjustment for changes in the value of $R_w$ are made by adjustment of the voltage divider 28. $R_w$ will usually vary somewhat over the course of many hundreds of feet of borehole travel. In general, it does not change very rapidly and its value for the different subsurface formations is usually known from past experience in other boreholes in the same geographical region. If no prior knowledge of $R_w$ is known, then a preliminary run can be made with an appropriate exploring device or devices for determining this quantity.

As indicated by Equation 1 above, the function former 29 is constructed to provide an output signal which corresponds to the reciprocal of the square root of the input signal. This operation satisfies Equation 5 and, hence, the output signal at the output of function former 29 corresponds to the desired $S_w \phi$ value. This $S_w \phi$ signal is then supplied to the galvanometer unit 31 to produce a corresponding curve or trace on the recording film 35.

For the case of the shallow investigation resistivity signal $R_{xo}$ from the exploring device 14, the various determining factors are the same as for the deep investigation signal except that in this case the measurement is made in a region close to the borehole wall which will have been invaded by fluid filtrate from the drilling mud 12, provided that the formation is permeable to the flow of fluids. This mud filtrate invasion pushes the formation water originally in this region farther back into the formation. If any oil is present, some of it will usually also be displaced by the mud filtrate. Since the mud filtrate is now the conductive fluid which occupies the pore space, the saturation formula of Equation 4 is rewritten as:

$$S_{xo}^2 = \frac{R_{mf}}{\phi^2 R_{xo}} \quad (6)$$

where $S_{xo}$ is the flushed zone water saturation or fractional amount of pore space in the flushed zone occupied by mud filtrate and $R_{mf}$ is the resistivity of the mud filtrate.

For the present method, it is preferred to rewrite Equation 6 as:

$$\sqrt{\frac{R_{mf}}{R_{xo}}} = S_{xo} \phi \quad (7)$$

The quantity $S_{xo} \phi$ represents the fractional amount of formation volume which is occupied by mud filtrate in the flushed zone region of the formation.

To determine the desired $S_{xo} \phi$ quantity, the $R_{xo}$ signal from the shallow investigation device 14 is applied to a voltage divider 37. The voltage divider 37 is set to modify the $R_{xo}$ signal in accordance with the value of $1/R_{mf}$. $R_{mf}$ is known from measurements made on samples of the drilling mud used in the borehole being surveyed. The function former 38 then serves to provide an output signal which corresponds to the reciprocal of the square root of its input signal. Consequently, Equation 7 is satisfied and the signal at the output of function former 38 corresponds to $S_{xo}\phi$. This signal is then supplied to the galvanometer unit 32 to produce a correspondingly designated trace or curve on recording film 35.

A typical record produced on the recording film 35 is shown in FIG. 2 of the drawings. As there seen, the horizontal scale values are calibrated in terms of percentage porosity, while the vertical values are scaled in terms of borehole depth in feet. If the horizontal separation of the recorded three curves is considered and their true meaning appreciated, then some rather startling results come to light. Considering first the horizontal dimension A on FIG. 2, this corresponds to the deflection of the $S_w\phi$ curve. Thus:

$$A = S_w\phi = \text{formation water fraction} \quad (8)$$

The dimension B representing the horizontal separation between the $S_{xo}\phi$ and $S_w\phi$ curves is:

$$B = S_{xo}\phi - S_w\phi = \text{movable oil fraction} \quad (9)$$

The reason this dimension B corresponds to the movable oil fraction is because if no oil or other hydrocarbon were present, then the mud filtrate fraction $S_{xo}\phi$ for the flushed zone would be exactly equal to the formation water fraction $S_w\phi$ for the uncontaminated zone. In other words, only water would have been displaced from the flushed zone. If, however, oil is also present and if some of this oil is displaced by the mud filtrate, then the mud filtrate fraction $S_{xo}\phi$ is correspondingly greater than the formation water fraction $S_w\phi$. Thus, the separation between these two curves (dimension B) gives an indication of the quantity of movable oil which is present at this particular depth in the borehole.

The horizontal dimension C corresponding to the separation between the $\phi$ and $S_{xo}\phi$ curves is also of interest. This dimension C is:

$$C = \phi - S_{xo}\phi \quad (10)$$

or $$C = \phi(1 - S_{xo}) \quad (11)$$

By definition, however, $$(1 - S_{xo}) = ROS \quad (12)$$

where ROS is the residual oil saturation expressed as the fractional amount of pore space occupied by such residual oil. In other words, any of the pore space in the flushed zone which is not occupied by mud filtrate is occupied by residual oil. Consequently, $$C = \phi(ROS) = \text{residual oil fraction} \quad (13)$$

Since the three dimensions A, B and C add up to a value corresponding to the deflection of the $\phi$ curve, $$\phi = A + B + C \quad (14)$$

or, in other words, $$\phi = \text{formation water} + \text{movable oil} + \text{residual oil} \quad (15)$$

Thus, all of the pore space has been accounted for. More important, the amounts of the different types of fluids that occupy this pore space has been determined. Consequently, a fairly accurate prediction can be made as to the formation zones which will provide commercially profitable oil production. The movable oil is, of course, the oil which can be fairly readily produced. The residual oil, on the other hand, is relatively tightly locked in the formation pore spaces and, for all practical purposes, is usually considered as being unproducible, at least by conventional methods. It is also seen, therefore, that the separation between the $S_{xo}\phi$ and $S_w\phi$ curves provides an indication of the permeability of the formations to the flow of oil.

In order to emphasize that the quantities recorded on the recording film 35 are in terms of fluid volumes, the horizontal scale of FIG. 2 has also been calibrated in terms of fluid quantity in barrels per acre-foot. The relationship between the fluid fraction and barrels per acre-foot is:

Barrels per acre-foot = 7760 (fluid fraction)   (16)

By integrating the appropriate area on the graph of FIG. 2, the number of barrels per acre for any given fluid in any given formation zone can be determined.

As seen from the foregoing, the present invention provides a relatively rapid and efficient method of gaining highly important information concerning the subsurface earth formations. The three specific exploring devices described in connection with FIG. 1 are particularly advantageous in geographical regions where formation conditions cause the drilling mud contained in the borehole to assume a relatively "salty" (highly conductive) character. The present method, however, is not limited to these three specific exploring devices and other known devices for measuring the desired formation parameters may instead be utilized. Also, it is not necessary that the output signals from the electrical exploring devices be directly proportional to "resistivity." They may instead be in terms of "conductivity," the reciprocal of resistivity. Both relate to the same basic electrical characteristic and, hence, a measurement of one provides an indication of the other and vice versa. Since conductivity is the reciprocal of resistivity, the function formers 29 and 38 of FIG. 1 would not be required to provide a reciprocal operation where the input signals are in terms of conductivities.

Instead of running the three exploring devices through the borehole at the same time, they may instead be run through the borehole one at a time on separate trips. In order to provide for the combining of the three records obtained on the three separate trips, each set of measurements could be recorded in an appropriate manner on punched paper tape. The three paper tape recordings can then be played back in unison to simultaneously provide the three required signals. These three signals would then be processed in the same manner as if they were being received from a single borehole instrument as shown in FIG. 1 to provide the desired composite record or chart. A paper tape recording and playback system suitable for this purpose is described in greater detail in copending application Serial No. 246,201, filed in the name of D. R. Tanguy on December 20, 1962.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. A method of investigating a subsurface earth formation traversed by a borehole containing a drilling fluid comprising: obtaining measurements of the electrical resistivity of first and second portions of the formation, the first portion being immediately adjacent the borehole and the second portion being at a greater distance from the borehole; obtaining a measurement of the porosity of the formation; converting the first and second resistivity measurements into measurements indicating the amount of conductive fluid in the respective formation portions; and comparing the porosity measurement and the converted resistivity measurements to obtain indications of the amounts of the different types of fluids that may be present in the formation.

2. A method of investigating a subsurface earth formation traversed by a borehole containing a drilling fluid comprising: obtaining measurements of the electrical resistivity of first and second portions of the formation, the first portion being a zone immediately adjacent the borehole which is flushed by the drilling fluid and the second portion being a zone located at a greater lateral distance from the borehole which is uncontaminated by the drilling fluid; obtaining a measurement of the porosity of the formation; converting the first and second resistivity measurements into measurements proportional to the product of fluid saturation times porosity; and comparing the porosity measurement and the converted resistivity measurements to obtain indications of the amounts of the different types of fluids that may be present in the formation.

3. A method of investigating a subsurface earth formation traversed by a borehole containing a drilling fluid comprising: obtaining measurements of the electrical resistivity of first and second portions of the formation, the first portion being immediately adjacent the borehole and the second portion being at a greater distance from the borehole; obtaining a measurement of the porosity of the formation; converting each of the first and second resistivity measurements into a measurement proportional to $$\frac{1}{\sqrt{R}}$$

where R is the resistivity of the corresponding formation portion; and comparing the porosity measurement and the converted resistivity measurements to obtain indications of the amounts of the different types of fluids that may be present in the formation.

4. A method of investigating subsurface earth formations traversed by a borehole containing a drilling fluid comprising: obtaining measurements of the electrical resitivity of first and second portions of the formations, the first portion being immediately adjacent the borehole and the second portion being at a greater distance from the borehole; obtaining measurements of the porosity of the formations; converting the first and second resistivity measurements into measurements indicating the amount of conductive fluid in the respective formation portions; and recording the porosity measurements and the converted resistivity measurements on the same record chart against a common depth scale to provide indications of the amounts of the different types of fluids that may be present in the formations.

5. A method of investigating a subsurface earth formation traversed by a borehole containing a drilling fluid comprising: obtaining measurements of the electrical resistivity of first and second portions of the formation, the first portion being immediately adjacent the borehole and the second portion being at a greater distance from the borehole; converting each of the first and second resistivity measurements into a measurement proportional to $$\frac{1}{\sqrt{R}}$$

where R is the resistivity of the corresponding formation portion; and comparing the converted resistivity measurements to provide indications of the amounts of water and movable hydrocarbons that may be present in the formation.

6. A method of investigating subsurface earth formations traversed by a borehole containing a drilling fluid comprising: measuring the electrical resistivity of the formations with a pad-mounted, wall-engaging electrode system; measuring the electrical resistivity of the formations with a cylindrical electrode system having a central survey current electrode and upper and lower elongated focussing current electrodes; measuring the porosity of the formations with a sonic exploring device; converting the two sets of resistivity measurements into measurements indicating amounts of conductive fluid in the formations; and recording the porosity measurements and the converted resistivity measurements on the same record chart against a common depth scale to provide indications of the amounts of the different types of fluids that may be present in the formations.

References Cited in the file of this patent

UNITED STATES PATENTS

| | | |
|---|---|---|
| 3,002,148 | Nall | Sept. 26, 1961 |
| 3,022,488 | Stripling | Feb. 20, 1962 |
| 3,075,142 | Albright et al. | Jan. 22, 1963 |